(No Model.) 3 Sheets—Sheet 1.

T. O. PERRY.
AUTOMATIC VALVE.

No. 400,249. Patented Mar. 26, 1889.

WITNESSES:
L. W. Moyer
J. K. West

INVENTOR:
Thomas O. Perry.

(No Model.) 3 Sheets—Sheet 2.

T. O. PERRY.
AUTOMATIC VALVE.

No. 400,249. Patented Mar. 26, 1889.

WITNESSES:
L. W. Noyes
J. K. West

INVENTOR:
Thomas O. Perry.

(No Model.) 3 Sheets—Sheet 3.

T. O. PERRY.
AUTOMATIC VALVE.

No. 400,249. Patented Mar. 26, 1889.

Witnesses:
Frank S. Blanchard
Chas. L. Cadwallader

Inventor:
Thomas O. Perry
By Burton & Burton
Attorneys.

United States Patent Office.

THOMAS O. PERRY, OF CHICAGO, ILLINOIS.

AUTOMATIC VALVE.

SPECIFICATION forming part of Letters Patent No. 400,249, dated March 26, 1889.

Application filed January 18, 1886. Serial No. 189,010. (No model.)

*To all whom it may concern:*

Be it known that I, THOMAS O. PERRY, a citizen of the United States, residing at Chicago, in the county of Cook and State of Illinois, have invented a new and useful Automatic Valve, of which the following is a specification.

My invention relates to the automatic operation of a revolving valve through the agency of a current of air or other elastic fluid, which is subsequently to be operated upon and directed in its courses by the valve it actuates. The valve is rotated continually in one direction about its axis, motion being communicated to the valve from a revolving drum, which is either wholly or partially submerged in water or other liquid, and is caused to rotate by the current of air displacing water successively from the floats into which the interior is divided, so as to render one side of the drum buoyant. The water is contained in a closed vessel. Compressed air is admitted at the bottom, and after rising through the water and causing the drum to revolve accumulates in the upper part of the vessel, from whence it passes directly into the valve, which by its rotation controls the air in its subsequent courses, according to the duty it has to perform.

An auxiliary part of my invention is a revolving pocket whose office is to maintain a proper level of water in the closed vessel by transferring water from an exterior chamber to the closed vessel, so as to compensate for the waste due to absorption of moisture by the air passing through, or to possible leakage. The pocket is rotated by the drum in the same manner as the revolving valve.

Figure 1:
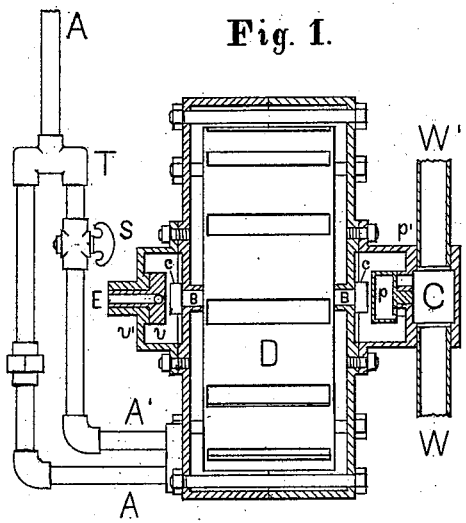
Figure 4:
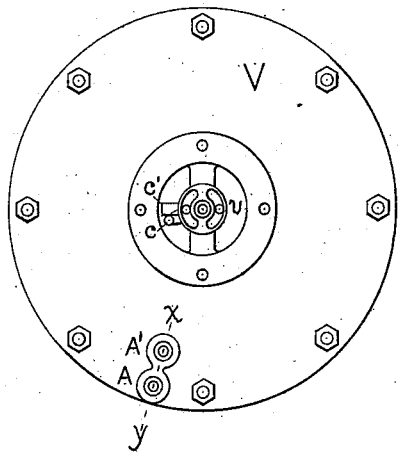
Figure 7:
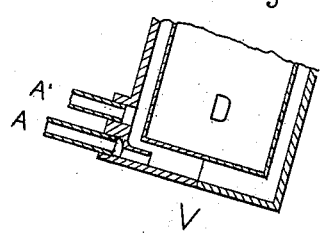
Figure 3:
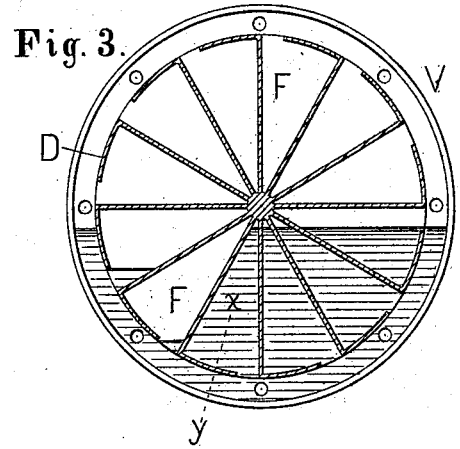
Figure 5:
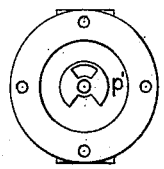
Figure 2:
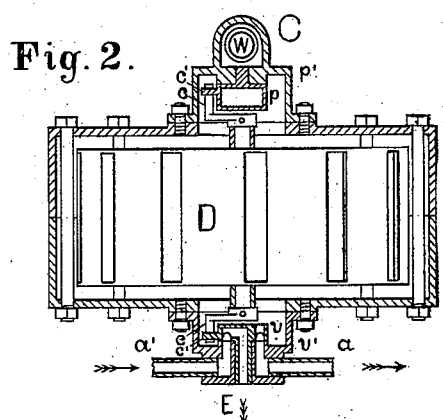
Figure 6:
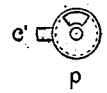
Figure 10:
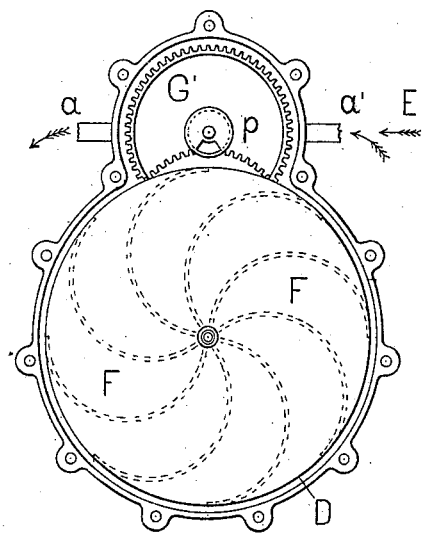
Figure 8:
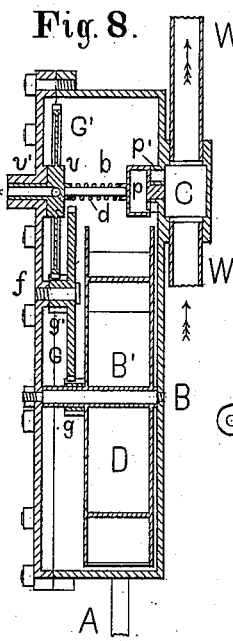
Figure 9:
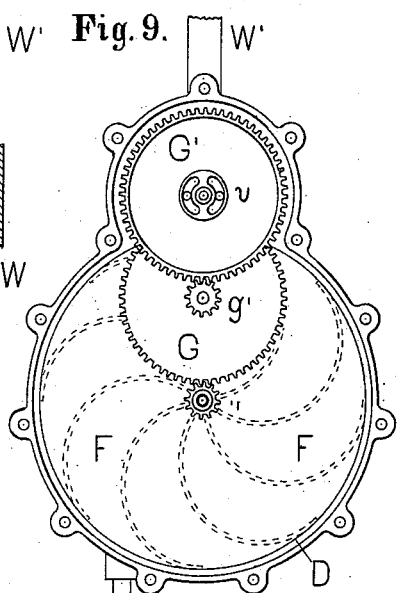
Figure 14:
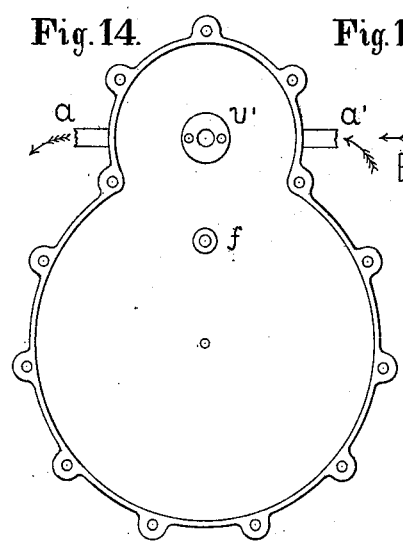
Figure 12:
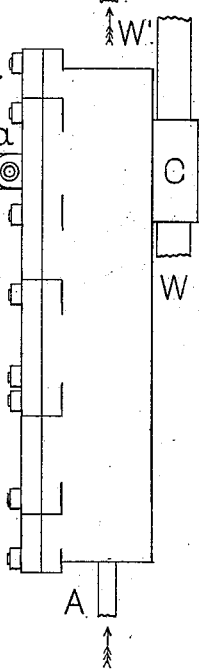
Figure 13:
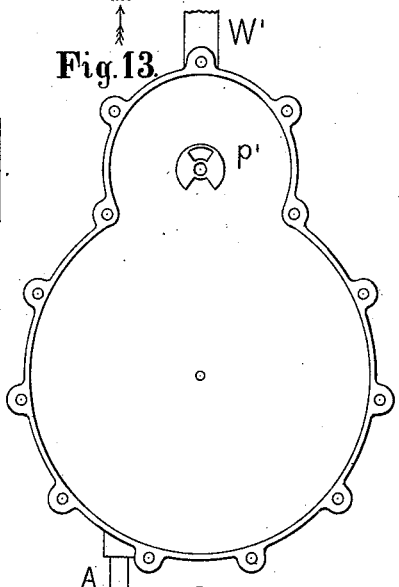
Figure 11:
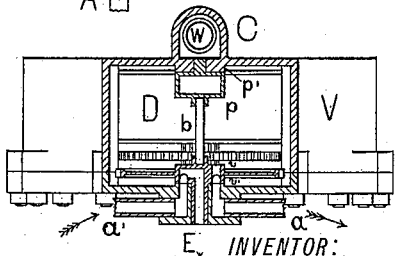
Figure 15:
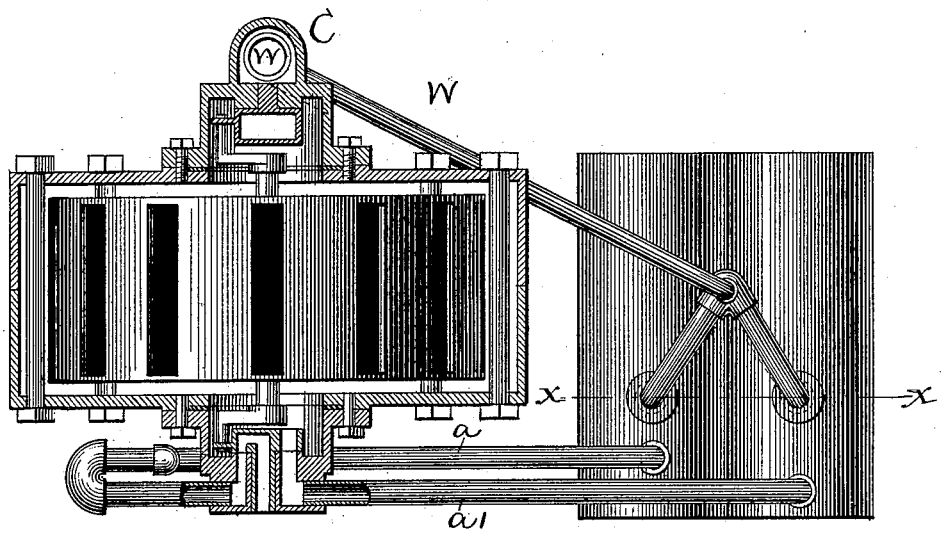
Figure 16:
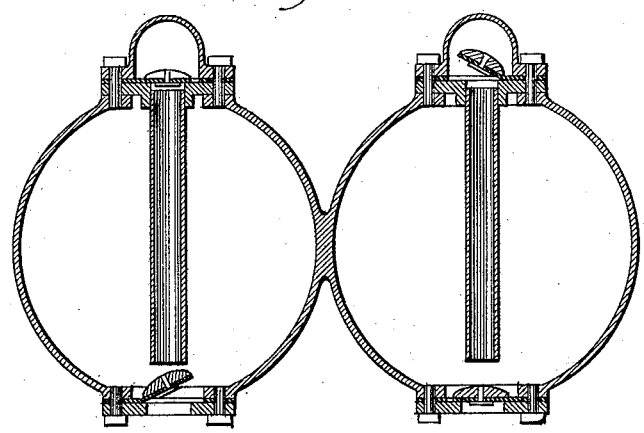

In the drawings, Figure 1 is a vertical section through the axes of valve and pocket, showing exterior of drum, inside of closed vessel, and connections. Fig. 2 is a horizontal section through axes of valve and pocket, disclosing exterior of drum, inside of closed vessel, &c. Fig. 3 shows a section perpendicular to the axis of the drum and closed vessel. Fig. 4 shows an interior side view of the closed vessel with the valve-seat removed, so as to expose the inner face of the valve. Fig. 5 is an interior view of the pocket-seat. Fig. 6 shows separately the revolving pocket, looking at its inner face. Fig. 7 is a partial section, through *x y*, of the drum and closed vessel, showing connection of pipes to admit air. Fig. 8 shows a modified form of my invention in vertical section through the axes of valve, pocket, and drum. Fig. 9 is an interior side projection of parts shown in Fig. 8, the left side of the closed vessel being removed. Fig. 10 is an interior side projection of parts shown in Fig. 8, the right side of the closed vessel being removed. Fig. 11 is a plan of parts shown in Fig. 8, the upper portion being shown in horizontal section through the axes of valve and pocket. Fig. 12 is an exterior view of modified closed vessel corresponding in position to Fig. 8. Fig. 13 is an interior view of the right side of modified closed vessel, showing inner face of pocket-seat. Fig. 14 is an interior view of the left side of modified closed vessel, showing inner face of valve-seat. Fig. 15 is a section similar to Fig. 2, but showing the valve connected to a pair of compressed-air chambers. Fig. 16 is a section through the line *x x*, Fig. 15, being a vertical section of the compressed-air chambers.

Corresponding letters indicate the same parts in the various figures.

The construction of the various parts of my invention is as follows:

V is a closed vessel supposed to be partially filled with water or other liquid, and is made impervious to both water and air. As shown in the drawings, it is made in two parts fastened together with bolts or studs around its periphery.

D is a drum whose interior is partitioned off into floats F, as shown in Figs. 3 and 10. This drum is either partially or wholly submerged in water and is free to turn about its axis, being supported in bearings attached to or forming a part of the sides of the closed vessel. In Figs. 1, 4, and 6 the drum is shown as supported on trunnions having bearings in the sides of the closed vessel. In Fig. 8 the drum is shown as turning on a rod whose ends are secured to the sides of the closed vessel.

The valve *v* consists of a disk provided with a hollow cylindrical stem projecting perpendicularly from the center of its inner face. On opposite sides of the stem are two openings into the inner face of the disk, one passing directly through the disk and the other communicating with the hollow stem, as illustrated in Figs. 1, 2, and 4, or in Figs. 8, 9, and 11. Each opening terminates at the inner face of the disk in a curved groove extending concentrically around the stem through something less than a semi-circumference, so as to leave some space between the ends of the two grooves, as shown in Fig. 4 or 9. The inner face of the valve $v$ is ground, so as to fit closely against the face of the valve-seat $v'$, in the center of which is a hole which receives the valve-stem, so that it may turn loosely therein about its axis. On opposite sides of the center are two openings into the valve-seat, which communicate with the two pipes $a$ and $a'$, connected as shown in Figs. 2, 11, and 12. These two openings are at the same distance from the axis of the valve as the two openings in the face of the valve-disk. The valve-seat either forms a part of or is attached to one side of the closed vessel.

The pocket $p$ is in the form of a hollow cylinder closed at one end. The other end also has a circular head provided with a short round central stem perpendicular to the face, which is ground so as to fit closely against the pocket-seat $p'$, at the center of which is a hole for receiving the pocket-stem and forming a bearing wherein it may revolve. Through the ground face on one side of the stem is an opening into the pocket, as shown in Figs. 1 and 6 or 8 and 10. The pocket-seat $p'$ is in the form of a circular boss attached to or forming a part of a partition separating a chamber, C, from the closed vessel V, and has an opening above the center through the partition, while the under side of the seat is cut away, as shown in Figs. 1 and 5 or 8 and 13. An air-pipe connects with the under side of the closed vessel, terminating in an opening beneath the drum D, preferably a little on one side of a vertical plane containing the axis of the drum, as shown in Figs. 1, 4, and 7 or 8 and 9. Pipes W and W' may connect with the chamber C, as shown in Figs. 1 and 2 or 8, 11, and 12.

My description of construction so far is applicable to all the figures shown in the drawings.

Referring to Figs. 1, 2, 3, 4, 5, 6 and 7, the further special construction is as follows: The trunnions B, supporting the drum D, have their bearings centrally in the sides of the closed vessel V, and on their ends which protrude through the bearings are fixed cranks $c$, as shown in Figs. 2 and 4. The valve $v$ and pocket $p$ are located opposite the trunnions B, on either side of the closed vessel, so that their axes are in line with the axis of the drum. The valve $v$ has an external spur, $c'$, on one side of the disk, located so as to come in contact with the crank $c$. The pocket $p$ has a similar spur correspondingly located, as shown in Figs. 2 and 4. The valve-seat $v'$ forms part of a separate piece bolted to one side of the closed vessel. Likewise the pocket-seat $p'$ and chamber C form part of a separate piece bolted to the other side of the closed vessel, which has openings around the trunnion-bearings, so as to expose both valve and pocket to the interior of the closed vessel, as shown in Figs. 2 and 4. The pipe A, which connects with the under side of the closed vessel, has a branch, A', which connects with the side of the closed vessel nearer the axis of the drum, so that it terminates in an opening near the under side of the vessel, but not underneath the drum. The branch A' is provided with a service-cock, S. The interior of the drum D is divided into floats F by radial partitions, and these floats are entirely inclosed, with the exception of the peripheral openings, as shown in Fig. 3. The surface of the water contained in the closed vessel should not be above the apertures in the disk of the valve $v$, and in this case the closed vessel should be something less than half-filled.

Referring to Figs. 8, 9, 10, 11, 12, 13, and 14, the further special modified construction is as follows: The drum D is supported on a rod whose ends are secured to the sides of the closed vessel, the center of the drum forming a sleeve which is free to turn upon the rod. A spur-pinion, $g$, is attached to the sleeve just outside of the drum and meshes into an intermediate spur-gear, G, supported on a stud, $f$, secured to the side of the closed vessel. Concentric with the gear G, and attached thereto or forming a part thereof, is a second spur-pinion, $g'$, which meshes into a second spur-gear, which is attached to or forms a part of the disk of the valve $v$, which is placed above the drum D, and the valve-seat $v'$ is attached to or forms a part of one side of the closed vessel. The pocket $p$ and pocket-seat $p'$ are similarly located on the opposite side of the closed vessel, so that the axes of the valve and pocket are in the same straight line. A bar, $b$, connects the valve $v$ and pocket $p$ in such a way that the turning of the valve about its axis causes the pocket; to rotate in like manner. The bar $b$ may be rigidly connected to both valve and pocket; but a loose connection is preferable, and may be formed by making the ends of the bar $b$ rectangular, so as to fit loosely into rectangular sockets on the outer faces of valve and pocket, as indicated in Figs. 8 and 11. A compressed spring, $d$, coiled around the bar $b$, with one end resting against the valve and the other resting against the pocket, serves to keep the ground faces of both valve and pocket against their respective seats. The interior of the drum D is divided by curved partitions into floats F, open only at the periphery of the drum. The surface of the water contained in the closed vessel should not be above the aperture in the disk of the valve $v$; but in this case the drum may be entirely submerged.

The operation of my invention is as follows: Referring to Figs. 1, 2, 3, 4, 5, 6, and 7, compressed air is admitted to the closed vessel through the pipe A, and rising through the water enters one or more of the floats F through the peripheral openings in the drum, and displacing water renders that portion of the drum buoyant. The position of the terminal of pipe A underneath the drum, as well as the shape of the floats F, causes the air to displace water from floats on one side of the axle only, so that their buoyancy causes the drum to revolve, water being displaced from the floats in succession as the drum rotates. On the opposite side of the axle the floats, as they are submerged, refill with water, the air escaping from them through the openings which are there uppermost. The motion of the drum is communicated directly to the valve $v$ and pocket $p$ by means of the cranks $c$ engaging the spurs $c'$. Thus the valve $v$ and pocket $p$ are made to revolve continually in one direction. The compressed air, after leaving the floats, accumulates above the water in the upper portion of the closed vessel, and being in contact with the valve $v$ passes through the exposed aperture of the disk into one of the curved grooves in the face of the valve, and from thence into that one of the two openings in the valve-seat which happens to be in communication with that groove, and into one of the pipes, $a$ or $a'$, connected therewith. Thus air is admitted alternately into first one and then the other of the pipes $a$ $a'$ as the valve revolves continuously in one direction about its axis. While one of the pipes, as $a$, is in communication with the interior of the closed vessel, the other pipe, as $a'$, communicates, through the other curved groove in the face of the valve, with the hollow stem E. This order of communication is reversed at each half-turn of the valve, $a$ and $a'$ communicating successively and alternately first with the interior of the closed vessel and then with the hollow stem of the valve. The duration of communication with each is equal to or somewhat less than the time required for a half-revolution of the valve, according as the diameter of the apertures in the valve-seat is made equal to or less than the spaces between the extremities of the curved grooves. If the air which enters the closed vessel is dry, it naturally absorbs moisture, and gradually reducing the quantity of water might finally cause failure of the drum to rotate. It is the office of the revolving pocket $p$ to prevent trouble from this source by supplying water to the closed vessel as fast as waste may occur from any cause.

The pocket operates as follows: The chamber C is supposed to contain a supply of water, and the pocket $p$ is caused to revolve about its axis through connection with the drum in the same manner as the valve $v$. As the opening in the ground face of the pocket passes the opening above the axis in the pocket-seat, communication is established between the pocket and the chamber C, and the pocket fills with water. As the pocket revolves, communication with the chamber C is cut off and the water in the pocket is confined until the opening in its ground face comes opposite to the cut-away at the under side of the pocket-seat, when the water will flow out of the pocket, provided the surface of the water in the closed vessel is not high enough to close the opening into the pocket. Thus the pocket will be filled from the chamber C and emptied into the closed vessel at each revolution of the pocket whenever the water in the closed vessel falls below a certain level. The tension of the compressed air in the closed vessel will prevent a flow of water from the pocket when the cut-away in the pocket-seat is immersed. It will be observed that while water is being transferred by pocketfuls from the chamber C to the closed vessel air is also transferred by pocketfuls from the closed vessel to the chamber C, and that the transfer of air and water is independent of the relative pressures or tensions in the closed vessel and chamber C. In fact, it would generally be required of the pocket to transfer water under conditions of higher pressure inside the closed vessel than in the chamber C. The chamber C may simply form a connection as part of a pipe, W W', through which water is conveyed. The frequency of reversing the position of the two openings in the ground face of the valve $v$ with reference to the pipes $a$ and $a'$ depends upon the rapidity with which the drum D revolves, and that will depend upon the quantity of air admitted beneath the drum through the pipe A, and in order to regulate this quantity a portion of the air may be conveyed into the closed vessel, so as not to rise beneath the drum, through a branch pipe, A', which joins the pipe A in a T, as shown in Fig. 1, and connects with the side of the closed vessel a little above the level of the under surface of the drum. By means of a service-cock in the branch A' the quantity of air passed through the branch pipe, and consequently the quantity admitted beneath the drum, may be regulated to suit requirements according to use.

In the modified form of my invention shown in Figs. 8, 9, 10, 11, 12, 13, and 14 rotary motion is transmitted to the valve and pocket through the intermediate gearing connecting them with the drum. Otherwise the action is the same as previously described; but this arrangement, besides allowing the drum to be entirely submerged in water, thus increasing its power of rotation and rendering a smaller drum admissible, also admits of regulating the speed of rotation of valve and pocket with reference to the speed of the revolving drum by using gear-wheels and pinions of suitable relative diameters. In the first form described the speed of rotation of valve and pocket is of course the same as if valve and pocket were rigidly connected, as they might be, with the axle of the drum. Such rigid connection would be simpler than the flexible connection shown, which, however, possesses the advantage of allowing the ground faces of valve and pocket to adjust themselves independently to their seats, even though the planes of the seats should not be exactly parallel, or if they should be otherwise slightly displaced.

This automatic valve was originally designed for use in connection with apparatus for elevating water by means of compressed air, W W' representing the pipe through which water is elevated and with which the chamber C connects, as illustrated. The compressed air, after performing duty in rotating the valve and pocket, passes alternately at intervals through the valve into the pipes $a$ and $a'$, which convey it to its destination, whence, after doing further duty, it is allowed to escape at alternate intervals by way of the same pipes, $a'$ and $a$, through the hollow stem E, into the open air; but I do not wish to confine myself to this particular use.

What I claim as my invention is—

1. In combination, substantially as set forth, a case containing water, a drum journaled horizontally in such case, comprising circumferentially-successive chambers having each an opening by which it communicates with the case, a pipe communicating with the case below the horizontal plane of the drum's axis, whereby air may be forced into the case and enter the chambers on one side of the drum, and a pocket revolved by the drum and communicating as it revolves alternately with the case and with an exterior water-supply, whereby the water in the case is replenished by pocketfuls at a time.

2. In combination with the case containing water, a drum journaled horizontally in such case, comprising chambers circumferentially successive, having each an opening by which it communicates with the case, a pipe communicating with the case below the horizontal plane of the drum's axis, by which air may be forced into the case and caused to enter the chambers on one side of the drum, a valve revolved by the drum controlling the escape of air from the case, and a pocket also revolved by the drum and communicating as it revolves alternately with the case and with an exterior water-supply, whereby as the air carries off water the pocket may supply it.

3. In combination with the case containing liquid and the chambered drum revolved therein, substantially as set forth, the valve E, which controls eduction from the case, and the pocket P, which furnishes water to the case, flexibly connected, and gearing which communicates motion from the drum to one of them, and thence through such flexible connection to the other, whereby they may severally adjust themselves to their respective seats, substantially as set forth.

4. In combination with the case and drum, constructed and operating substantially as described, the water-chamber C, communicating through a port with the case, the pocket P, covering said port and actuated by the drum, and having an aperture which coincides with the port at one position of the pocket, and at another position thereof stands uncovered and constitutes communication from the pocket to the case, whereby the pocket communicates alternately with the case and with the chamber C, and never with both at once, substantially as and for the purpose set forth.

5. In combination with the case and the chambered drum and the air-pipe admitting air forced into the case below the drum, the branch pipe A' of such air-pipe admitting air from the same source opening into the case at one side of the drum and provided with the regulating-cock S, substantially as and for the purpose set forth.

6. In combination with the case containing liquid, and the chambered drum revolved therein in the manner described, the valve E, which controls eduction from the case, the pocket P, which imports water into the case in the manner described, a shaft which connects said valve and pocket being loosely joined to them both, and a spring reacting between said valve and pocket to force them apart and hold them against their seats, respectively, substantially as set forth.

THOMAS O. PERRY.

Witnesses:
 JOSEPH R. KEENEY,
 CHARLES BURRIDGE.